UNITED STATES PATENT OFFICE.

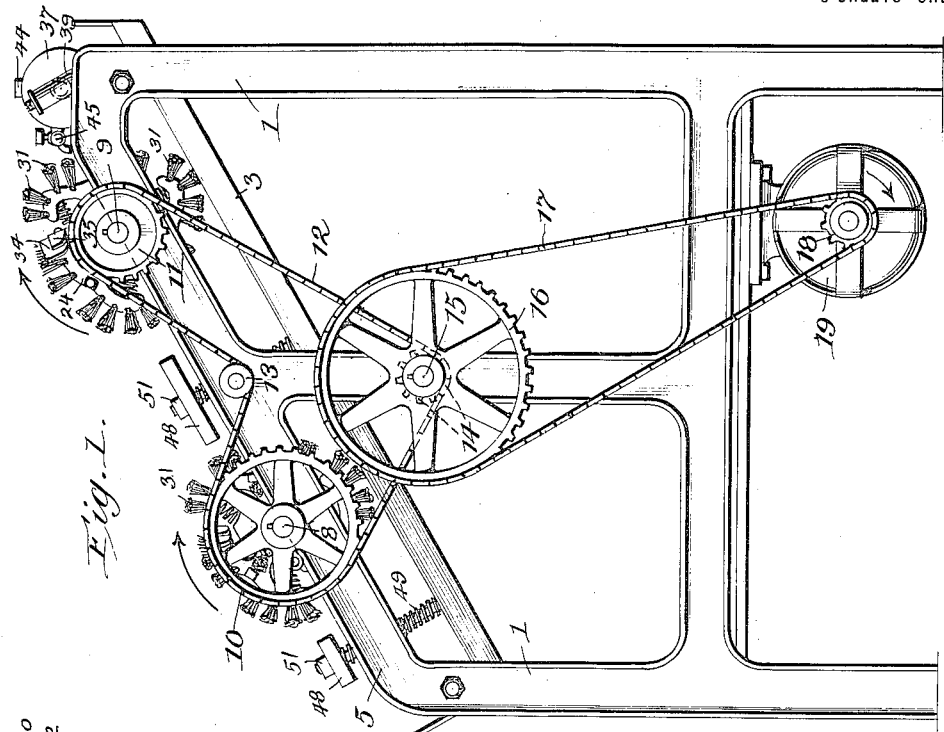

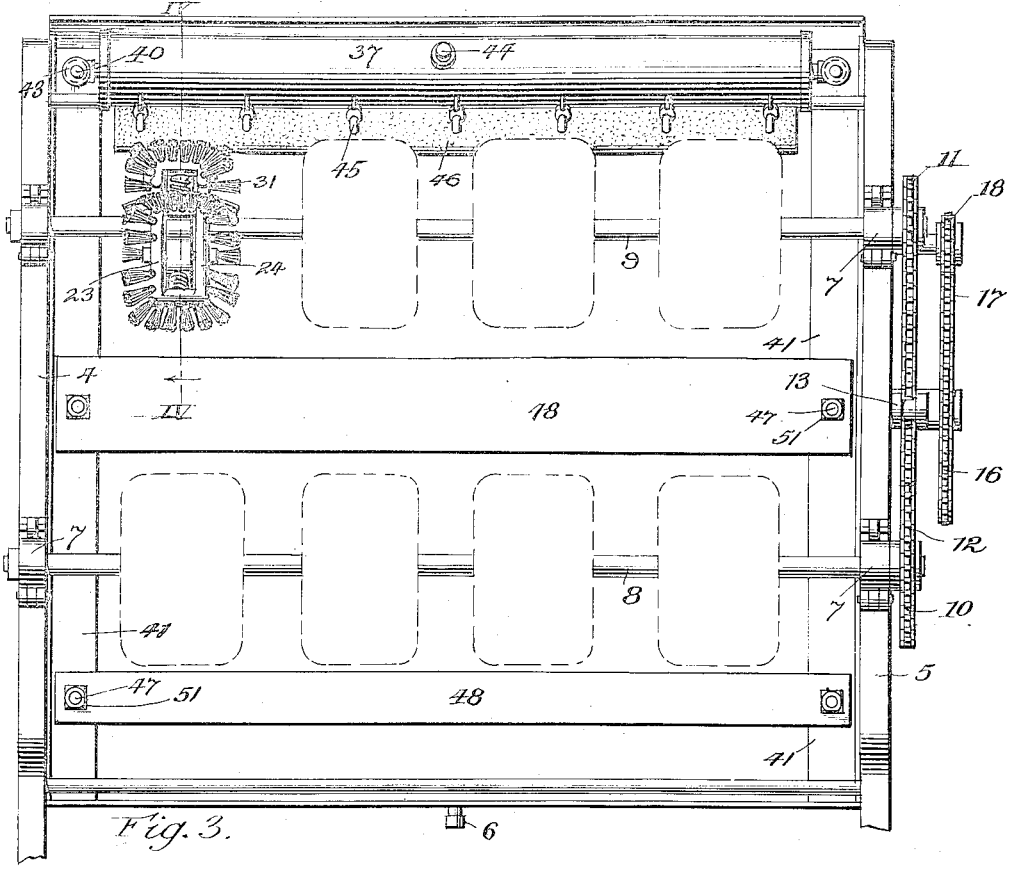

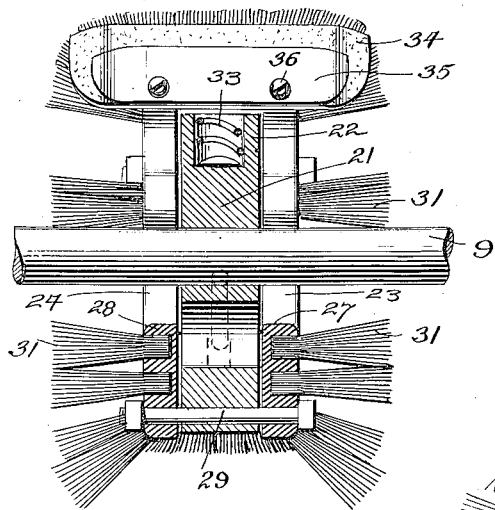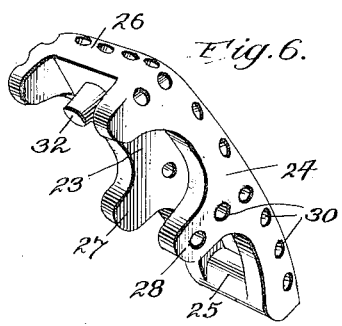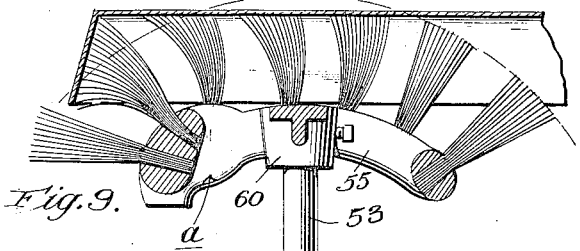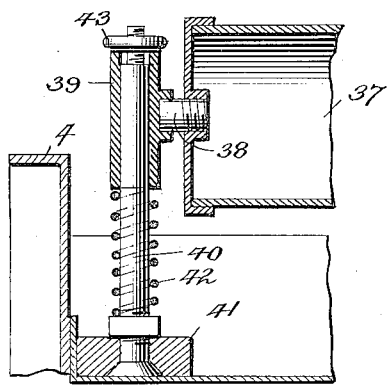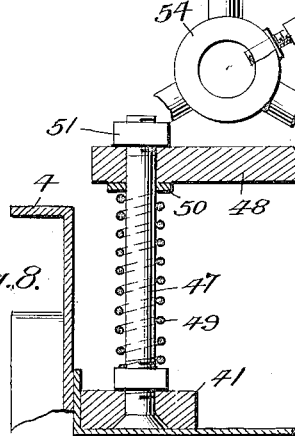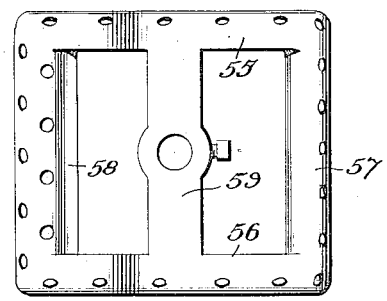

THOMAS H. KELLER, OF LANCASTER, PENNSYLVANIA.

PAN CLEANING AND GREASING MACHINE.

1,289,475.

Specification of Letters Patent. Patented Dec. 31, 1918.

Application filed July 10, 1917. Serial No. 179,664.

*To all whom it may concern:*

Be it known that I, THOMAS H. KELLER, a citizen of the United States, residing at Lancaster, in the county of Lancaster and State of Pennsylvania, have invented a certain new and useful Improvement in Pan Cleaning and Greasing Machines, of which the following is a specification.

My present invention pertains to an improved pan cleaning and greasing machine, the construction and advantages of which will be hereinafter set forth.

The main object of the invention is to produce a simple and effective machine, which will efficiently clean the pans and readily grease them.

Ordinary bread pans are angular in form and difficulty is experienced in removing the adhering crust from the pan, and particularly in the reëntrant angles formed between the pan sides and the bottom. Difficulty is likewise experienced in properly greasing such portions, and another object of the invention resides in the production of a brush structure which will readily and effectively reach such parts and accomplish the work of cleaning and greasing.

A further object resides in the provision of improved means for feeding and applying the grease to the greasing brushes.

A still further object is the provision of means for properly supporting the pans while the brushes are acting thereon, such means taking the form of a spring-sustained rest against which the pan is forced while the brushes are acting.

One embodiment of the invention is disclosed in the annexed drawings, wherein:

Figure 1 is a side elevation of the machine;

Fig. 2 a vertical sectional view thereof;

Fig. 3 a top plan view;

Fig. 4 a sectional view, on the line IV—IV of Fig. 3, of one of the brushes and the grease-applying mechanism;

Fig. 5 a transverse sectional view of one of the brush elements, taken on the line V—V of Fig. 4;

Fig. 6 a perspective view of one of the brush-heads;

Fig. 7 a detail sectional view, on the line VII—VII of Fig. 4, of the oil or grease reservoir mounting;

Fig. 8 a like view of the spring support for the pan-sustaining frame;

Fig. 9 a sectional elevation of a modified form of brush; and

Fig. 10 a top plan view of the brush-head employed with such modified construction.

Having reference to the construction shown in Figs. 1 to 8 inclusive, the frame is denoted by 1, and is provided with suitable lugs 2, upon which is supported a pan 3, said pan lying in an inclined position and in substantial parallelism to the upper side bars 4 and 5 of the frame. The pan at its lower forward side will preferably be provided with a drain pipe 6, Fig. 2.

Secured to the upper faces of the side bars 4 and 5 are bearings 7, so constructed that they may be readily opened for the removal of shafts 8 and 9 which are journaled therein. Shaft 8 has secured to one end thereof a sprocket 10 and shaft 9 has attached to it a somewhat smaller sprocket 11. A sprocket chain 12 passes about said sprockets, beneath an idler 13, and about a sprocket wheel 14 secured to a shaft 15. Said shaft likewise has secured to it a relatively large sprocket 16 and a chain 17 passing thereabout receives its motion from a sprocket 18 driven from an electric motor 19 or from any other suitable source of power. Motion is, therefore, transmitted from the motor to shafts 8 and 9 and to the brushes mounted thereon. The brushes, of which there are a plurality on each shaft, are preferably alike in form and a description of one will suffice. Adjustably secured to the shaft 8 (or 9) by means of a set-screw 20, (Fig. 4), is a hub 21, having a series of lugs or arms 22, extending outwardly therefrom in spaced relation.

The brush-heads are alike in form and are shown in perspective in Fig. 6. They are substantially rectangular in outline, comprising side bars 23, 24, connected by two end or cross bars 25 and 26. The side bars 23 and 24 are made slightly convex from end to end and are rounded at their outer face. The cross bars 25, 26 are also preferably rounded, as best shown in Fig. 4, and the bar 26, when the parts are in their normal positions, stands outwardly from the axis of the head a distance greater than the cross bar 25. Extending inwardly from the side bars are a pair of lugs or arms 27, 28. The head is pivotally mounted upon one of the lugs 22 by a through-pin or bolt 29. The various bars of the head and the outer face of the lugs 27, 28 are provided with a series of openings denoted by 30, in which are secured tufts of bristles 31, the openings being so formed that the tufts flare outwardly from the head, as best indicated in Figs. 3 and 5, while the tufts secured in the openings in the lugs 27, 28 stand out at right angles to said lugs and are adapted to contact with the side walls of the pan when it is positioned over the brushes. A lug 32 extends inwardly from the cross-bar 26 and a coiled spring 33 is interposed between said lug and the hub 21, one end of the spring being seated in a socket formed in the head so as to keep it from jumping out of place. These springs tend normally to rock the brush-heads upon their pivots 29, so that the brush heads may be said to be spring-supported with reference to the hub about which they are disposed. A plurality of brushes will be secured upon each shaft and two or more of them may be brought close together to form in effect a single brush for utilization in connection with wide or long pans when the pans are presented with their major axis in line with the shaft. This may be readily accomplished by merely loosening the set-screws 20 and bringing the brushes to their desired positions.

One or more of the brush-heads may be provided with a scraper, such scraper being preferably secured to the cross-bar 25, as best indicated in Figs. 4 and 5. It may be said to comprise a flexible sheet 34, as for instance of leather, held in place by a strip or plate of metal 35, screws 36 passing through said plate and the leather scraper, into the cross bar 25. The scraper 34, as will be seen, is arranged close to the adjacent tufts or bristles or those carried by the cross bar 25, and tends to sustain said bristles. The scraper also, while the brush is in operation, will contact with the pan and tend to remove any adhering crust or foreign matter therefrom which could not otherwise be dislodged by the tufts or bristles.

The brushes mounted on the shaft 8 are designed to be utilized as cleaning brushes, and the others, carried by the shaft 9, are the greasing brushes. To properly supply the latter brushes with grease I preferably employ a reservoir adapted to contain the grease, and to feed the same to a flexible, absorbent strip which contacts with the brushes as they rotate. The reservoir is denoted by 37, and extends from one side of the machine to the other, being provided at its ends with stud axles or pintles 38, which find their bearings in sleeves 39 mounted upon upwardly-projecting stems or rods 40. The lower ends of said rods are secured (in the construction shown) in bars 41 which rest upon the bottom of the pan 3. A coiled spring 42, encircling the rod, tends to force the sleeve 39 upwardly against a stop nut 43, and to maintain the reservoir in an elevated position. The reservoir is provided with a filling cap 44, and with a series of faucets or valves 45, which overlie a flexible absorbent strip 46, said strip being secured to the reservoir in any suitable manner. As will be seen upon reference to Fig. 4, the strip extends outwardly into the path of the bristles, and by contacting therewith the grease is taken up by the bristles and applied to the pan. By employing a plurality of faucets or valves 45, the grease may be applied to the strip to a greater or less extent at any desired point thereon, and when it is wished to remove the strip or pad 46 out of contact with the brushes it is only necessary to rotate the reservoir and to carry the strip upwardly out of the path of movement of the brushes.

The bars 41 also form the support for a series of upwardly-extending posts 47, said posts being arranged in oppositely-disposed side bars forming guides for two or more cross bars 48. Said bars are held in an elevated position by springs 49, which encircle the posts 47 and bear against washers 50 located beneath the cross bars 48. Stop nuts 51, secured to the upper ends of the posts 47, above the bars 48, limit the upward movement of said bars. These bars 48 form a rest for the bread pan, denoted by 52. The operator will place the pan in an inverted position over the brush, and force the edge of the pan against the cross bar or bars, as the case may be, and downwardly on to the brush. The spring support for the pan, while it is being operated on, takes off a certain amount of jar and enables the operator to hold the pan in proper relation to the brush, preventing the pan from being unduly pressed against the tufts or bristles, while at the same time presenting a support which will enable the operator to hold the pan in proper relation to the brush.

By having the brush-heads pivoted and the cross-bar 26, or one end of the brush-head, normally extending farther from the axis of the brush than the other end, I am enabled to cause the brush to enter the angles formed between the bottom and the ends of the pan, as is clearly shown in Fig. 4. To thoroughly cleanse the angles or corners of the pan has been a difficulty heretofore experienced in this art, and this difficulty is completely overcome by the present construction. Not only does the peculiar formation of the brush-head contribute to this, but the springs 33 also tend to effect the desired object, by throwing the rear end of the brush-head outwardly when the head comes into line with the corner of the pan.

While I prefer the form of brush above set forth, I do not desire to be limited thereto, for it is conceivable that other forms of brushes, having the tufts projecting outwardly at one end or portion beyond those carried by the other portion of the head may effect the same result. Thus in Figs. 9 and 10 I have shown a modified form of brush-head. The heads, as in the construction above described, are arcuate in shape, and are adjustably connected to arms 53, extending outwardly from a hub 54, which may be adjustably secured upon the shaft 8 or 9, as the case may be. The head, as in the former construction, may be said to comprise a substantially rectangular frame, composed of side bars 55, 56, end bars 57, 58, and a cross bar 59, said cross bar being provided with a hub 60 adapted to receive and be secured to arm 53. One end bar 58 is made somewhat larger than the other end bar, and its upper face and the immediately adjacent portions of the side bars project somewhat above the other parts of the brush-head and are formed upon a radius materially shorter than that of the side bars, the center from which they are struck being denoted by $a$ in Fig. 9. The various side and end bars are bored out to receive tufts of bristles, the bristles along the side bars inclining outwardly, while the rounded and enlarged bar 58 is provided with a plurality of rows of bristles. There is thus formed at one end of the brush a portion which presents an abruptly rounding face, and which is especially adapted to enter the angles of the pan body.

Upon reference to Fig. 9 the operative relation of the brush to the pan is clearly shown. As indicated in dotted lines, it will be seen that those tufts carried by the end bar 57 and the side bars 55, 56 will not contact with or enter into the angular portions of the pan, but that the bristles or tufts carried by the enlarged end bar 58 will enter such angular portions. The outwardly-extending tufts under this form enter the angles between the sides of the pan and the bottom thereof, as do the outwardly-extending bristles in the form above described.

From the foregoing description it will be noted that the machine is relatively simple and in practice has been found highly efficient; that the pan 3 catches any dirt and grease and may be easily cleaned, and that the brushes may be quickly removed from the shafts, which are readily dismounted from the frame. The machine may, therefore, be easily cleaned and kept in a sterile condition.

Having thus described my invention, what I claim is:

1. In a machine of the character specified, the combination of a shaft; a supporting element secured thereto; and a series of arcuate members pivoted on said element; and short bristle tufts carried by each member.

2. In a machine of the character specified, the combination of a shaft; and a series of brushing elements rotatable therewith, each element comprising a body curved in outline and having at one end a sharply curved and outwardly-projecting portion, bristles being mounted in the body and projecting portion whereby the bristles in said portion being out of radial alinement with the axis of the shaft at said projecting portion the bristles will take such outline that they may readily enter and contact with the angular portion of a pan.

3. A brush for pan-cleaning and greasing machines, comprising a bowed or curved frame one end of which extends above the upper line of the body proper and is sharply curved, and bristles mounted in said frame.

4. A brush for pan-cleaning and greasing machines, comprising a substantially rectangular frame bowed or curved in the direction of its length and having one end extending above the upper line of the body proper, and a series of tufts of bristles mounted in said frame, the tufts along the side of the frame inclining outwardly.

5. In a machine of the character specified, the combination of a shaft; and a series of brush elements supported thereby, each element having tufts of bristles, the outer ends whereof are substantially concentric with the axis of the shaft, and a series of tufts at one end of the brush element, the outer ends of which tufts describe a relatively sharp curve.

6. In a machine of the character specified, the combination of a shaft; a hub secured thereto, said hub having a plurality of outwardly-projecting elements; a brush head pivotally mounted on each element; and a spring interposed between one end of each brush head and the hub.

7. In a machine of the character specified, the combination of a shaft; a hub secured thereto; a plurality of rocking brush heads carried by the hub; and a spring associated with each head and the hub, for throwing one end of the head outwardly.

8. In a machine of the character specified, the combination of a shaft; a hub secured thereto; a plurality of arcuate brush elements pivoted at their center to the hub; and a spring associated with each of said elements, tending to throw one end thereof outwardly.

9. In a machine of the character specified, the combination of a rotary brush; a flexible scraper projecting outwardly therefrom and lying in contact with the bristles of the brush; and a metallic strip forming a backing for the scraper.

10. In a machine of the character specified, the combination of a shaft; a hub secured thereto; a rocking brushhead secured to the hub; means for throwing one end only of said brushhead away from the hub; and a flexible scraper mounted upon the opposite end of the brush head.

11. In a machine of the character specified, the combination of a shaft; a hub secured thereto; a plurality of arcuate brushing elements pivoted at their center to the hub, each of said elements having one end projecting outwardly beyond the normal plane of the body; and a spring associated with each of said elements adjacent said end and tending to throw said end outwardly away from the hub.

12. In a machine of the character specified, the combination of a shaft; a hub secured thereto; a plurality of arcuate brushing elements pivoted at their center to the hub, said elements having inwardly-extending arms carrying tufts; and a spring associated with each arcuate brushing element and tending to throw the same outwardly.

13. In a machine of the character specified, the combination of a rotary brush; a reservoir located adjacent thereto; a flexible element adapted to receive grease from said reservoir and to convey it to the brush; and means for positively rotating the brush.

14. In a machine of the character specified, the combination of a rotary brush; a grease reservoir; a flexible, absorbent element attached to the reservoir; means for controlling the flow of grease from the reservoir to said element; and means for positively rotating the brush.

15. In a machine of the character specified, the combination of a rotary brush; a grease reservoir rotatably mounted adjacent to said brush; a flexible grease conducting element carried by the reservoir and normally projecting toward the brush and adapted to contact therewith under certain adjustments of the reservoir; and means for controlling the flow of grease from the reservoir to said flexible element.

In testimony whereof I have signed my name to this specification.

THOMAS H. KELLER.